United States Patent [19]
Friedrich et al.

[11] 3,853,685
[45] Dec. 10, 1974

[54] OPEN-CELL RIGID FOAM PLASTIC

[75] Inventors: Edmund Friedrich, Rheinheim, Germany; Josef Mosele, Biberist, Switzerland; Rolf Schaumann, Wurenlos, Switzerland; Manfred Vogelmann, Villigen, Switzerland

[73] Assignee: Brown Boveri & Company Limited, Baden, Switzerland

[22] Filed: July 9, 1973

[21] Appl. No.: 377,222

[30] Foreign Application Priority Data
July 24, 1972  Switzerland...................... 10990/72

[52] U.S. Cl.................... 161/161, 161/403, 117/61, 117/138.8 G
[51] Int. Cl.............................................. B32b 3/26
[58] Field of Search ...... 161/161, 190, 403; 117/61, 117/98, 138.8 A, 138.8 D, 138.8 G; 260/2.5 BD

[56] References Cited
UNITED STATES PATENTS

| | | | |
|---|---|---|---|
| 3,503,822 | 3/1970 | Turkewitsch | 161/160 |
| 3,524,825 | 8/1970 | Rill, Jr. | 161/190 |
| 3,675,377 | 7/1972 | Suter | 161/160 |
| 3,752,695 | 8/1973 | Finelli | 161/160 |

*Primary Examiner*—William J. Van Balen
*Attorney, Agent, or Firm*—Pierce, Scheffler & Parker

[57] ABSTRACT

An open-cell rigid foam for use as an insulating element in electrical equipment operated at low temperatures wherein the cell walls are made from urea-formaldehyde and are pressure filled with a gaseous dielectric agent such as a halocarbon e.g., tetrafluoromethane ($CF_4$), or sulphur hexafluoride ($SF_6$), having a boiling point of not greater than about $-20°C$. The cells are then sealed by application of a thermosetting polymer such as polyurethane, epoxide or polyester resin.

The foam is manufactured by evacuating the basic cellular foam structure in an autoclave and then filling the evacuated foamed structure under pressure with the gaseous dielectric agent, after which the thermosetting polymer is applied so as to seal in the dielectric.

15 Claims, No Drawings

OPEN-CELL RIGID FOAM PLASTIC

The present invention relates to an improved open-cell rigid foam for use as an insulating element in electrical equipment and apparatus and to a method for its manufacture.

The general purpose of the invention in particular is to provide in the simplest and least expensive way possible open-cell rigid foams able to withstand high electrical and mechanical stresses by means of which electrical equipment and apparatus of extremely high stress capacity can be built in a manner hitherto technologically not practicable and of particular advantage with regard to the material used.

In the case of closed-cell foams, the gas bubbles formed during the foaming process are enclosed on all sides by the basic, e.g., plastics, material so that there is practically no connection between the individual voids of the foam. If, however, the voids within a foam are connected with each other and with the surrounding air, such foams are termed open-cell foams.

It is further known that the structure of the foam cells depends in general on the foaming processes applicable to the group of plastics in question, on the expanding agent used, on the rate of expansion, on the consistency of the basic material, on the influence of temperature or pressure, and on other factors. For these reasons it has hitherto not been possible to create foams arbitrarily for every purpose in closed or open-cell form.

With regard to the application of foamed materials it is also known that important properties of the foam, such as thermal conductivity, air permeability and diffusion factors, etc. are essentially dependent on the formation of the cells. Thus, for insulation purposes, the most suitable foams are of the rigid kind with closed, or at least predominantly closed, cells. A distinction is made between rigid and soft elastic foams, according to how the foam structure reacts to a short-time compressive stress. A further distinction is made between tough and brittle foams, according to their behavior on deformation.

Rigid or soft foams produced in a variety of ways have already been proposed as materials for high-voltage insulation. The expanding agents used for making these foams are of either chemical or physical nature so that, depending on the expansion process, the cells of such foams are filled usually with $N_2$ or $CO_2$ in the case of chemical expansion or, in the case of physical expansion, with gases dissolved in the basic materials or with volatile liquids which become gaseous under the influence of heat.

Foams produced by means of the chemical expanding agents mentioned above do not have good dielectric properties. On the other hand, foams produced by physical expanding agents, in particular monofluorotrichloromethane ($CCl_3F$), for example, have more favourable dielectric properties than the foams referred to above, but the commonly used expanding agent mentioned unfortunately has a relatively high boiling point of 24°C. At comparatively low temperatures, e.g., −30°C, therefore, the dielectric behaviour of foams produced in this manner is very poor because the expanding agent in the cells, otherwise in gaseous form, condenses at this temperature. The consequent reduction of pressure in the cells impairs the dielectric properties, such as breakdown strength, and therefore foams of this kind are unsuitable for high-voltage applications.

The principal object of the invention is to provide, with the aid of open-cell rigid foams, electrically insulating foams having a broad thermal range of application which are able to withstand medium and high voltages and high mechanical stress, and which can be used to make relatively light, reliable electrical components, equipment or apparatus for high capacities both simply and with appreciably smaller dimensions than hitherto.

This objective is achieved in that the foamed structure is evacuated in an autoclave, then filled under pressure with a gaseous or liquid dielectric and finally sealed under pressure by means of thermosetting polymers. In accordance with the invention, the cell walls are at least partially of urea-formaldehyde resin, the cells are filled with at least one gaseous dielectric having a dielectric strength greater than that of air, and the cells are dealed with at least one polymer, the dielectric having an advantageous boiling point less, or no greater than −20°C.

It is particularly beneficial to fill the cells with a dielectric comprising a halocarbon or a halocarbon mixture. It is thus recommended that the dielectric should be of tetrafluoromethane ($CF_4$) or trifluoromethane ($CHF_3$) or trifluorochloromethane ($CF_3Cl$) or hexafluoroethane ($C_2F_6$) or trifluorobromoethane ($CF_3Br$) or difluorochloromethane ($CHClF_2$) or pentafluorochloroethane ($C_2ClF_5$) or perfluoropropane ($C_3F_8$) or difluorodichloromethane ($CCl_2F_2$) or of mixtures of these compounds. It is also appropriate to use sulphur hexafluoride ($SF_6$) as the expanding agent.

In another form of the invention at least one dielectric can be added which has a boiling point greater than −20°C. Such additions can be octafluorocyclobutane ($C_4F_8$) or tetrafluorodichlorethane ($C_2Cl_2F_4$) or monofluorodichloromethane ($CHCl_2F$) or monofluorotrichloromethane ($CCl_3F$) or hexafluorodichloropropane ($C_3Cl_2F_6$) or a mixture of these compounds.

It is particularly beneficial if the material for sealing the cells comprises polymers which can be cast or moulded or sintered or can be painted, preference being given to polyurethane or epoxide casting materials or polyester resins.

The open-cell rigid foams described are particularly suitable for the manufacture of load-bearing parts of electrical equipment and apparatus which can be used at low temperatures and serve as high-voltage insulation. The rigid foams can be employed in the manufacture of stationary insulating components of switchgear installations. Deserving special mention are partition walls or pin-type insulators, busbar cladding or supporting frameworks for medium and high-voltage circuit-breakers, or the load-bearing insulation of cable terminations. The subject matter of the invention can also be used in the manufacture of insulation for current and voltage transformers, and in particular as foam insulation for the end-windings and slots of electrical machines. By incorporating conductive materials in the foam this can also be used to create protective earthing for electrical equipment and apparatus.

An important advantage of the invention consists especially in the fact that the open-cell foam structure in conjunction with the described manner of filling and sealing the cells results in properties of the foam which greatly extend the present range of application of open-cell foams in terms of both quantity and quality. Thus not only are rigid foams having closed, or predominantly closed, cells achieved which are suitable for certain insulating purposes, but also, owing to maximum freedom in the choice of the dielectrics and sealing materials, their suitability can be predicted largely independently of the initial structure of the cell formation. By suitably sealing the cells it is possible above all to ensure that the dielectric remains in the open-cell foam, as in a closed-cell foam. The choice of dielectric is no longer governed to the same extent by the material properties of the foam structure because the cells are expanded and filled in separate processes which can be performed with different media, thus also making it possible to use dielectrics which could not be considered before.

Through being able to employ dielectrics which remain gaseous down to relatively low temperatures, or through using mixtures of such dielectrics having a low boiling point together with additions of other gases which condense at higher temperatures, in conjunction with cell-wall and cell sealant materials which can be freely chosen with respect to the dielectric, sealed open-cell rigid foams are obtained which not only have an outstanding mechanical load-bearing capacity, but can also be used at low temperatures.

Further advantages offered by the invention consist especially in simplifying the design and construction of all electrical equipment and apparatus in which the invention can be employed at least as an equivalent of the forms of insulation customary hitherto. Thus equipment and apparatus built in this way, or parts of them such as high-voltage insulators, can be made smaller and considerably cheaper than conventional steel constructions, for service down to low temperatures, i.e., at least over the whole specified range. Owing to the functional arrangement of the rigid foams in the equipment and apparatus, their space requirement is approximately half that of equivalent installations at present in existence. Furthermore, because the weight of the product is lower, transport and easier and erection costs are greatly reduced.

By replacing the dense plastics, such as non-porous polyester or epoxide materials, commonly used at present in particular as high-voltage insulation, the subject matter of the invention eliminates the risk of cracking which exists especially with dense cast plastics, and thus prevents corona discharge and electrical breakdown.

The entire process, namely, evacuation of the foamed structure, filling the cells with the dielectric medium and then sealing the dielectric within the cells takes place within the autoclave.

We claim:

1. The method of manufacturing an open-cell rigid foam which comprises the steps of evacuating the foamed structure in an autoclave, filling the evacuated foamed structure under pressure with a dielectric in gaseous or liquid form and sealing said dielectric filled foamed structure by means of thermosetting polymers.

2. The method of manufacturing an open-cell rigid foam which comprises the steps of evacuating a foamed structure made from urea-formaldehyde in an autoclave, filling the evacuated foamed structure under pressure with a gaseous dielectric constituted by a halocarbon selected from the group consisting of tetrafluoromethane ($CF_4$), trifluoromethane ($CHF_3$), trifluoromethane ($CF_3Cl$), hexafluoroethane ($C_2F_6$), trifluorobromomethane ($CF_3Br$), difluorochloromethane ($CHClF_2$), pentafluorochloroethane ($C_2ClF_5$), perfluoropropane ($C_3F_8$) and difluorodichloromethane ($CCl_2F_2$) or a mixture of these compounds and then sealing said dielectric filled foamed structure with a thermosetting polymer selected from the group consisting of polyurethane, epoxide and polyester resin.

3. An open-cell rigid foam wherein the cell walls are made at least partially from urea-formaldehyde, said cells being filled with at least one gaseous dielectric having a dielectric strength greater than air, and said cells being sealed with at least one thermosetting polymer.

4. An open-cell rigid foam as defined in claim 3 wherein said gaseous dielectric has a boiling point not higher than $-20°C$.

5. An open-cell rigid foam as defined in claim 3 wherein said gaseous dielectric is constituted by a halocarbon or a halocarbon mixture.

6. An open-cell rigid foam as defined in claim 3 wherein said gaseous dielectric is constituted by a halocarbon selected from the group consisting of tetrafluoromethane ($CF_4$), trifluoromethane ($CHF_3$), trifluoromethane ($CF_3Cl$), hexafluoroethane ($C_2F_6$), trifluorobromomethane ($CF_3Br$), difluorochloromethane ($CHClF_2$), pentafluorochloroethane ($C_2ClF_5$), perfluoropropane ($C_3F_8$), and difluorodichloromethane ($CCl_2F_2$) or a mixture of these compounds.

7. An open-cell rigid foam as defined in claim 3 wherein said gaseous dielectric is constituted by sulphur hexafluoride ($SF_6$).

8. An open-cell rigid foam as defined in claim 3 and which further includes the addition of another gaseous dielectric having a boiling point greater than $-20°C$.

9. An open-cell rigid foam as defined in claim 8 wherein said additional gaseous dielectric is selected from the group consisting of octafluorocyclobutane ($C_4F_8$), tetrafluorodichlorethane ($C_2Cl_2F_4$), monofluorodichloromethane ($CHCl_2F$), monofluorotrichloromethane ($CCl_3F$) and hexafluorodichloropropane ($C_3Cl_2F_6$) or a mixture of these compounds.

10. An open-cell rigid foam as defined in claim 3 wherein said cell sealant is constituted by polymers which can be cast, moulded, sintered or painted.

11. An open-cell rigid foam as defined in claim 10 wherein said cell sealant is polyurethane casting material.

12. An open-cell rigid foam as defined in claim 10 wherein said cell sealant is an epoxide casting material.

13. An open-cell rigid foam as defined in claim 10 wherein said cell sealant is a polyester resin.

14. An open-cell foam as defined in claim 3 and which further incorporates conductive material for establishing an earth protection for the apparatus in which the foam forms an insulating component.

15. An open-cell rigid foam as defined in claim 3 wherein the cells thereof are filled with a gaseous dielectric mixture consisting of 90 percent of difluorodichloromethane ($CCl_2F_2$) and 10 percent monofluorotrichloromethane ($CCl_3F$).

* * * * *